United States Patent [19]

Sukhov et al.

[11] 4,036,105
[45] July 19, 1977

[54] MACHINE FOR EDGE FORMING OF SHEETS FOR WELDING

[76] Inventors: Ivan Alexeevich Sukhov, Pudozhskaya ulitsa, 4a, kv. 22; Igor Nikolaevich Soloviev, ulitsa Stoikosti, 2/11, kv. 227; Vyacheslav Mikhailovich Shults, Grazhdansky prospekt, 108, korpus 1, kv. 107; Alexandr Sergeevich Lipilov, Piskarevsky prospekt, 24, kv. 17; Victor Reingoldovich Stilve, Grazhdansky prospekt, 23, korpus 3, kv. 76, all of Leningrad, U.S.S.R.

[21] Appl. No.: 666,502

[22] Filed: Mar. 12, 1976

Related U.S. Application Data

[63] Continuation of Ser. No. 573,254, April 30, 1975, abandoned.

[51] Int. Cl.² .......................... B23C 3/12; B23D 1/02
[52] U.S. Cl. .................................. 90/24 F; 51/87 R; 83/425.4; 90/18; 144/246 F
[58] Field of Search .................. 90/11 R, 16, 18, 24 F; 83/407, 408, 409, 409.1, 409.2, 425, 425.1, 425.2, 425.3, 425.4; 144/117 B, 246 F, 247, 249 B; 51/87 R, 112

[56] References Cited

U.S. PATENT DOCUMENTS

| 810,971 | 1/1906 | Palmer | 83/425 X |
|---|---|---|---|
| 1,292,157 | 1/1919 | Towsend | 51/87 R |
| 1,885,772 | 11/1932 | Sesko | 51/87 R |
| 1,897,724 | 2/1933 | Gaisman et al. | 51/87 R |
| 2,690,034 | 9/1954 | Laverdisse | 51/112 |
| 3,172,331 | 3/1965 | Nole et al. | 90/24 F |
| 3,254,568 | 6/1966 | Pickard | 90/24 R |
| 3,834,274 | 9/1974 | Dowd | 90/11 R |

FOREIGN PATENT DOCUMENTS

| 335,344 | 9/1930 | United Kingdom | 144/246 R |

*Primary Examiner*—Othell M. Simpson
*Assistant Examiner*—Z. R. Bilinsky

[57] ABSTRACT

A machine for edge forming of sheets for welding comprising drive rolls for feeding a sheet being machined to oppositely mounted fixed cutting tools arranged along the edges being machined and support rollers mounted adjacent to the cutting tools above and beneath the sheet being machined, the drive rolls are accommodated at least in pairs, in separate casings, the casings being interconnected in series by means of longitudinally extending beams disposed above and under the sheet being machined in such a manner that at the portions between the casings, the lower beams support the oppositely mounted cutting tools and axles of the support rollers located beneath the sheet being machined, and the upper beams support axles of the support rollers located above the sheet being machined. The machine ensures high-speed edge forming of sheets of a thickness of up to 30 mm in a single pass and straightens out crescent-shaped edges making them parallel.

6 Claims, 8 Drawing Figures

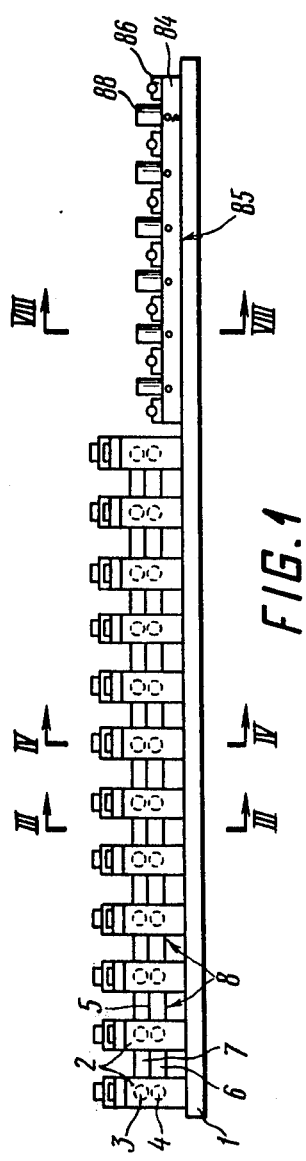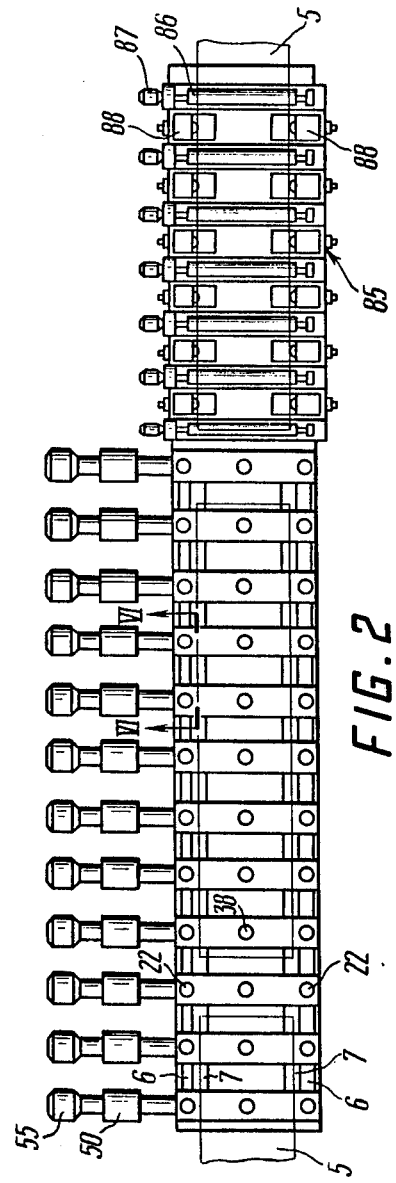

MACHINE FOR EDGE FORMING OF SHEETS FOR WELDING

This is a continuation of application Ser. No. 573,254 filed Apr. 30, 1975 now abandoned.

BACKGROUND OF THE INVENTION

The present invention relates to mechanical engineering, and, more particularly, to machines for edge forming of sheets for welding.

The present invention can most advantageously be used in making welded pipes of a diameter ranging from 800 to 2500 mm from sheets.

Known in the art is a machine for machining lateral edges of sheets longitudinally moving in a production flow in a horizontal plane.

This machine comprises driven rolls for feeding a sheet being machined to oppositely mounted fixed cutting tools arranged along the edges being machined. Support rollers are mounted adjacent to the cutting tools above and beneath the sheet being machined.

The support rollers are mounted on supports each being arranged on either sheet edge being machined. The axles of the upper rollers are rigidly fixed, and the axles of the lower rollers are adjustable depending on the sheet thickness. In addition, each support has a movable carriage with a cutting tool which is loaded by a compression spring, the spring cooperating with the support through a screw.

The supports are adjustably mounted according to the sheet width on a transverse beam extending over the sheet. The transverse beam is pivotably connected to a support means by two parallel drawbars extending over the sheet in the direction opposite to the direction of the sheet movement. To limit the displacement of the cutting tools towards each other, the carriages are provided with positioning rollers cooperating with the sheet edges being machined.

The above-described machine cannot ensure a high-speed machining in a single pass with optimal sheet edge cutting conditions with a considerable thickness of sheets from 10 to 30 mm and with an allowance of up to 20 mm for machining per each edge of the sheet since the machining of each edge is effected with a single cutting tool so that several passes are required to machine each edge with an allowance of 20 mm with the sheet thickness from 10 to 30 mm, whereby the efficiency of the machine is low.

In addition, it is very important that the above described machine does not possess sufficient stiffness of the system of "machine-tool-workpiece" since the transverse beam mounting the supports is pivotally connected to the support means. Therefore, as the sheet moves, each cutting tool follows unevenness of the surface and fails to straighten out crescent-shaped edges which frequently occur in practice.

The latter circumstance restricts the field of application of the known machine. Thus, this machine cannot be used for edge forming of sheets in the manufacture of large-diameter pipes (from 800 to 2500 mm) snce very stringent requirements are imposed on such sheets as regards both the parallel relationship between the opposite edges and the rectilinearity thereof.

SUMMARY OF THE INVENTION

The principal object of the invention is to provide a machine for edge forming of sheets for welding with a substantially high stiffness of the system "machine-tool-workpiece".

Another object of the invention is to provide a machine for straightening out crescent shaped edges and making them parallel.

Still another object of the invention is to provide a machine ensuring high-speed machining of edges of sheets of a thickness of up to 30 mm in one pass.

These and other objects are accomplished by a macine for edge forming of sheets for welding by machining lateral edges of sheets moving in a production flow in a horizontal plane comprising drive rolls for feeding a sheet being machined to oppositely mounted fixed cutting tools arranged along the edges being machined, and support rollers mounted adjacent to the cutting tools above and beneath the sheet being machined according to the invention, the drive rolls are accommodated, at least in pairs, in separate casings which are interconnected in series by means of longitudinally extending beams mounted above and under the sheet being machined in such a manner that at the portions between the casings, the lower beams support the oppositely mounted cutting tools and axles of the support rollers located beneath the sheet being machined, and the upper beams support axles of the support rollers located above the sheet being machined.

Due to the fact that the drive rolls are accommodated, at least in pairs, in separate casings which are interconnected in series by means of longitudinally extending beams mounted above and under the sheet being machined in such a manner that at the portion between the casings the lower beams support the oppositely mounted cutting tools and axles of the support rollers located beneath the sheet being machined, and the upper beams support axles of the support rollers located above the sheet being machined, a sufficient number of cutting tools can be arranged in the machine at either edge of the sheet to obtain an efficiency, in a single pass, which is 30–40 times greater than in conventional machines of this type, with a thickness of sheets from 10 to 30 mm and with an allowance of up to 20 mm.

Thus, sheets with minimal deviation from a specified size with parallel and straight edges are obtained, since, due to the stiffness of the system "machine-tool-workpiece", there is no relative displacement of the cutting tools and the sheet being machined in a direction normal to that of the sheet movement.

The opposite sides of the casings are preferably provided with grooves extending in parallel with the roll shafts, and drawbars are mounted in the grooves which are partially received within the longitudinally extending beams in parallel with the direction of the sheet movement and axially movable in the direction corresponding to the displacement of the casings towards each other, under the action of wedges mounted in the beams, through a distance providing for prestressing of the beams.

Due to such a construction, there is provided an integral stiff system "machine-tool-workpiece" which ensures even distribution of forces developed during the cutting at the cutting tools mounted on each lower longitudinally extending beam which forces have different values due to the non-uniform wear of the cutting edges of the tools and non-uniform allowance for machining resulting from the existing crescent-shaped edges of the sheet.

In order to provide for machining of sheets of various width, that is to widen the variety of sheets being machined, the longitudinally extending beams are preferably mounted on the drive roll casings so that they are movable in a horizontal plane normal to the direction of the sheet movement.

The displacement of the beams in a horizontal plane is preferably effected by supporting them on flat guides provided on the opposite sides of the casings so as to enable guided movement of the longitudinally extending beams.

It is also preferable that each of the support rollers located in the upper longitudinally extending beams be attached with its axle to a shackle which is mounted on the upper beam for limited rotation in the plane of rotation of the support roller under the action of a compression spring cooperating with this beam.

This construction provides for urging the sheet being machined against the lower support rollers and, hence, for elimination of eventual undulation of the sheet in a vertical plane, as well as reduction of vibration in the machining zone.

The invention is further characterized in that the drive of the rolls in each casing is preferably made independent so as to improve the stiffness of the drive.

The invention is also characterized in that there is provided a driven horizontal roller table before the casings of the drive rolls in the direction of flow of the sheets being machined, the roller table preferably having on its base, two parallel rows of carriages adjustable according to the width of the sheet being machined between the horizontal rollers on either side of the sheet, each having a movable slider normal to the direction of the sheet movement which is loaded by a compression spring cooperating with the carriage through an adjustment screw, the slider supporting a vertically extendng axle with a roller engaging the sheet edge.

This construction provides for automatic alignment of the edges of the sheets following one another with short intervals relative to the cutting edges of the tools so as to remedy sickle-shaped edges.

BRIEF DESCRIPTION OF THE DRAWINGS

The invention will now be described with reference to a specific embodiment thereof illustrated in the accompanying drawings, in which:

FIG. 1 is a front elevation view of a machine for edge forming of sheets for welding, according to the invention;

FIG. 2 is a plan view of the machine according to the invention;

DETAILED DESCRIPTION OF THE PREFERRED EMBODIMENT

Figure 3:
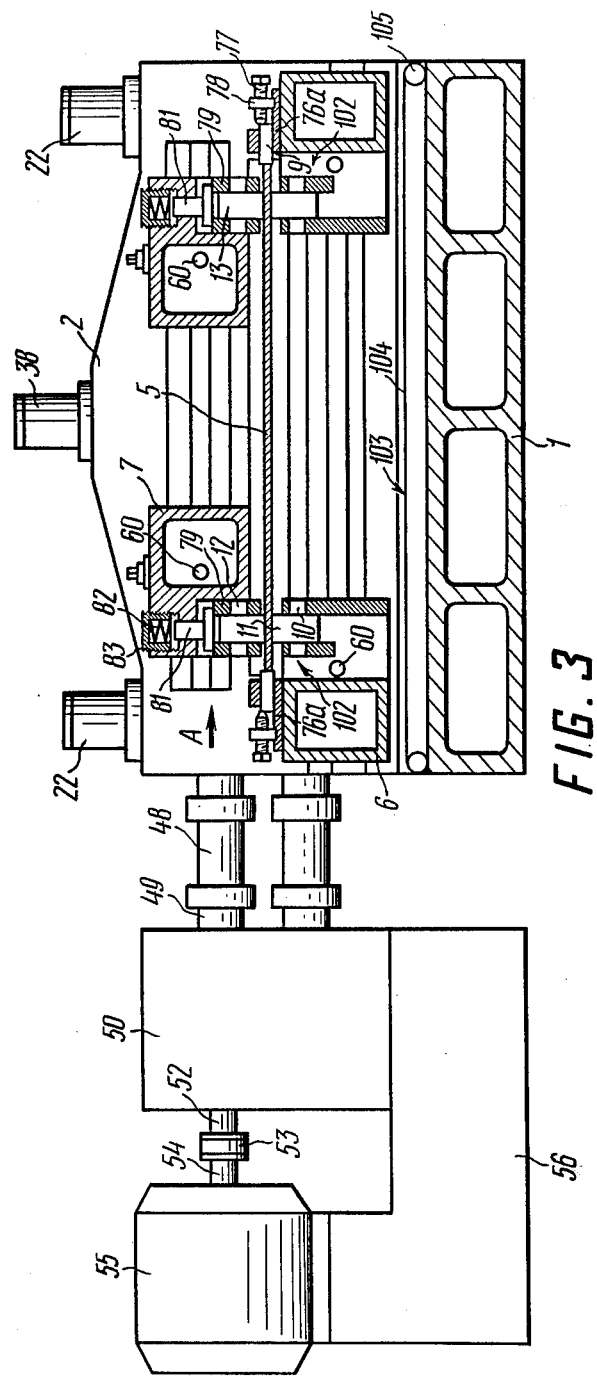
FIG. 3 is a sectional view taken along line III—III of FIG. 1, illustrating the relative position of an electric motor, a reduction gear, drive rolls and longitudinally extending beams interconnecting the drive roll casings, according to the invention.

According to the invention, there is provided a machine for edge forming of sheets for welding. A base 1 (FIGS. 1 and 2) mounts casings 2 disposed in series one after another. Each casing 2 accommodates a pair of drive rolls 3 and 4 for feeding a sheet 5 being machined.

The casings 2 are interconnected in series by means of longitudinally extending beams 6 and 7 disposed under and above the sheet 5 being machined, respectively, at the portions 8 between the casings 2. The lower longitudinally extending beams 6 support oppositely mounted cutting tools 9 (FIG. 3) and axles 10 of support rollers 11 which are located beneath the sheet 5 being machined. The upper longitudinally extending beams 7 support axles 12 of support rollers 13 which are located above the sheet 5 being machined.

At each portion 8 between the casings 2 there are provided two longitudinally extending beams 6 under the sheet being machined, and similarly two beams 7 are provided above the sheet 5 being machined. The beams 6 and 7 are mounted adjacent to the longitudinal edges of the sheet 5, and the support rollers 11 and 13 are mounted adjacent to the cutting tools 9 as in conventional machines of this type.

Figure 4:
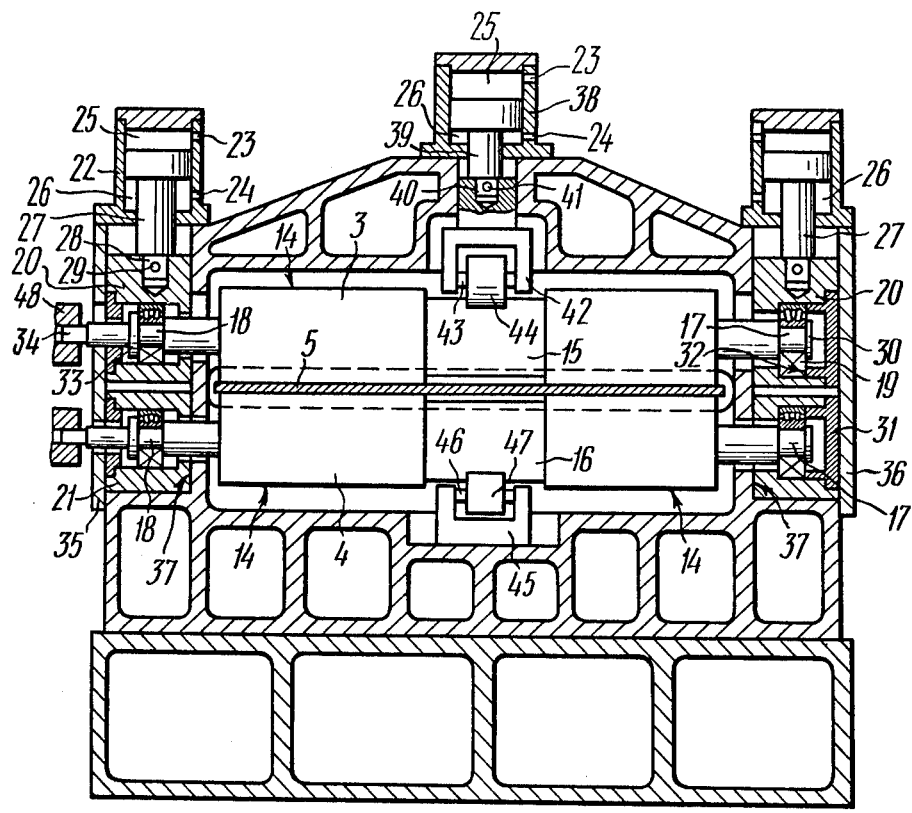
FIG. 4 is a sectional view taken along line IV—IV of FIG. 1, illustrating the arrangement of the drive rolls in their casings, according to the invention.

Similarly to conventional machines of this type, the drive rolls 3 and 4 are used for feeding the sheet 5 being machined to the oppositely mounted cutting tools 9. The rolls 4 (FIG. 4) are mounted in the casings 2 beneath the sheet 5 being machined. The rolls 3 are mounted in the same casings 2 above the sheet 5 being machined oppositely relative to the rolls 4.

The rolls 3 and 4 comprise cylinders having their generatrix surfaces 14 in contact and frictional engagement with the sheet 5 being machined during the movement thereof. Each roll 3 and 4 has two such surfaces 14 which are separated from each other by a neck 15 of the roll 3 and a neck 16 of the roll 4. At the opposite end faces of the surfaces 14, each roll is provided with journals 17 and 18, and spherical bearings 19 are mounted thereon with their inner races. The outer races of these bearings 19 are fixed in blocks 20 and 21, each of the blocks serving as support for one bearing 19. The blocks 20 are vertically movable inside the casings 2 and fixed therein. The blocks 21 are rigidly fixed in the casings 2.

For displacement of the blocks 20, there are provided hydraulic jacks 22 having ports 23 and 24 for oil supply and discharge. The ports 23 are used for feeding oil into a work stroke chamber 25 of each jack 22, and the ports 24 serve to admit oil to an idle stroke chamber 26 of each jack 22.

The actuation of the hydraulic jacks 22 is controlled by means of hydraulic distribution valves (not shown in the drawings).

The hydraulic jacks 22 are attached to the top portion of the casings 2. Piston rods 27 of the hydraulic jacks 22 are connected to the blocks 20 with their journals 28 and pins 29.

The spherical bearings 19 mounted on the journals 17 of the rolls 3 and 4 are prevented from axial displacement by means of retaining rings 30 mounted on the end face of the journal 17 and engaging the inner race of the spherical bearing 19, and by means of flanges 31 fixed to the blocks 20 and 21 and engaging with their support end faces 32 the outer race of the spherical bearing 19.

The spherical bearings 19 mounted on the journals 18 of the rolls 3 and 4 are prevented from axial displacement by means of nuts 33 screwed on the ends 34 of the rolls 3 and 4 and engaging the inner race of the bearings 19. The outer races of the bearings 19 mounted on the journals 18 are axially movable in the blocks 20 and 21 to compensate for linear elongation of the rolls 3 and 4 upon eventual temperature rise during continuous operation of the machine.

The displacement of the blocks 20 and 21 along the longitudinal axes of the rolls 3 and 4 is limited by covers 35 and 36 and support surfaces 37 of the casings 2.

The cover 35 is fixed to the lefthand end of the casing 2 (as shown in the drawing), and the cover 36 is fixed to the righthand end of the casing 2.

The hydraulic jacks 22 serve for frictional engagement of the rolls 3 and 4 with the sheet 5 being machined during the machining and for providing necessary traction forces at each pair of the rolls 3 and 4 accommodated in a common casing 2.

For more reliable and uniform frictional engagement of the rolls 3 and 4 with the sheet 5 being machined, an additional hydraulic jack 38 is provided at the top portion of each casing 2 in the middle part thereof. The hydraulic jack 38 has a piston rod 39 with a journal 40 connected to a shackle 42 by means of a pin 41. The shackle 42 is mounted for vertical movement in the casing 2. The shackle 42 mounts axles 43 of two support rollers 44 (only one support roller 44 is shown in the drawing). The rollers 44 engage the neck 15 of the roll 3.

Figure 5:
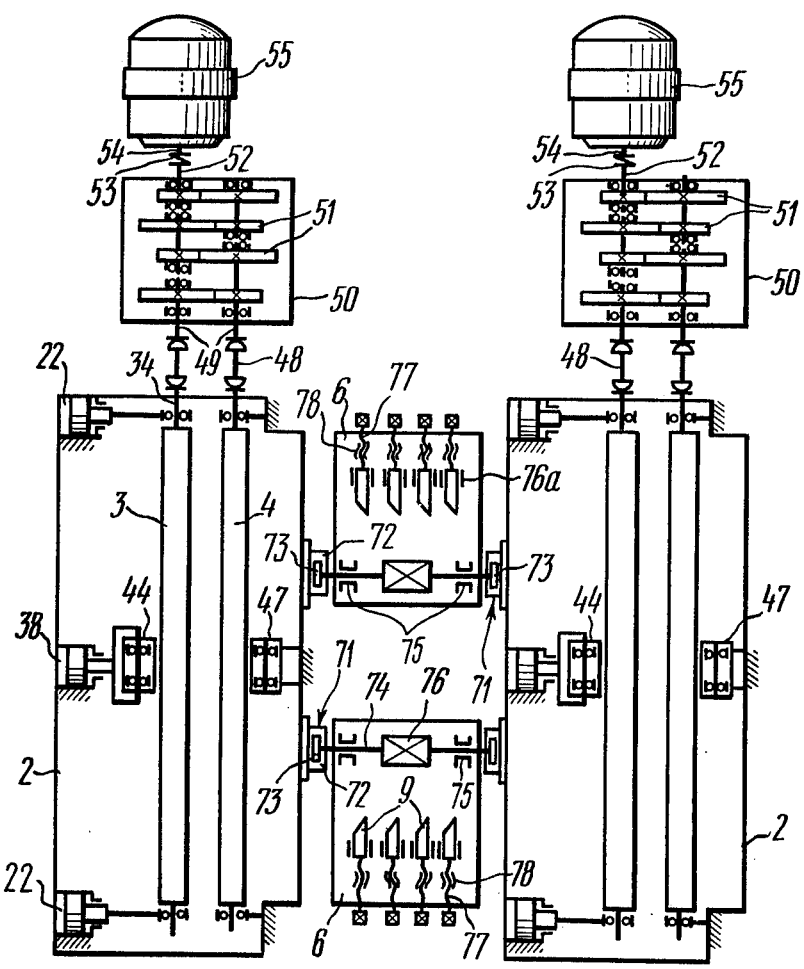
FIG. 5 is a diagram of force transmitting connection for a drive of two adjacent drive roll casings, according to the invention.

A support 45 is mounted under each roll 4 oppositely to the shackle 42, and the support 45 is fixed to the casing 2. The support 45 is provided with axles 46 of two support rollers 47 (only one roller 47 is shown in the drawing). The rollers 47 engage the neck 16 of the roll 4. The ends 34 (FIG. 4) of the rolls 3 and 4 which freely pass through the cover 35 outside the casing 2 are connected to universal joint shafts 48 (FIGS. 3 and 5). The universal joint shafts 48 connect the rolls 3 and 4 to output shafts 49 of a reduction gear 50. The reduction gear 50 is of a standard machine-tool type and comprises a chain of spur gears 51 coupling the output shafts 49 of the reduction gear 50 to an input shaft 52 of the reduction gear 50. The input shaft 52 of the reduction gear 50 is connected by means of an elastic coupling 53 to a shaft 54 of an electric motor 55. The electric motor 55 and the reduction gear 50 are mounted on a pedestal 56 rigidly fixed to a foundation of the machine (not shown).

Thus the drive of the rolls 3 and 4 in each common casing 2 is independent.

Figure 6:
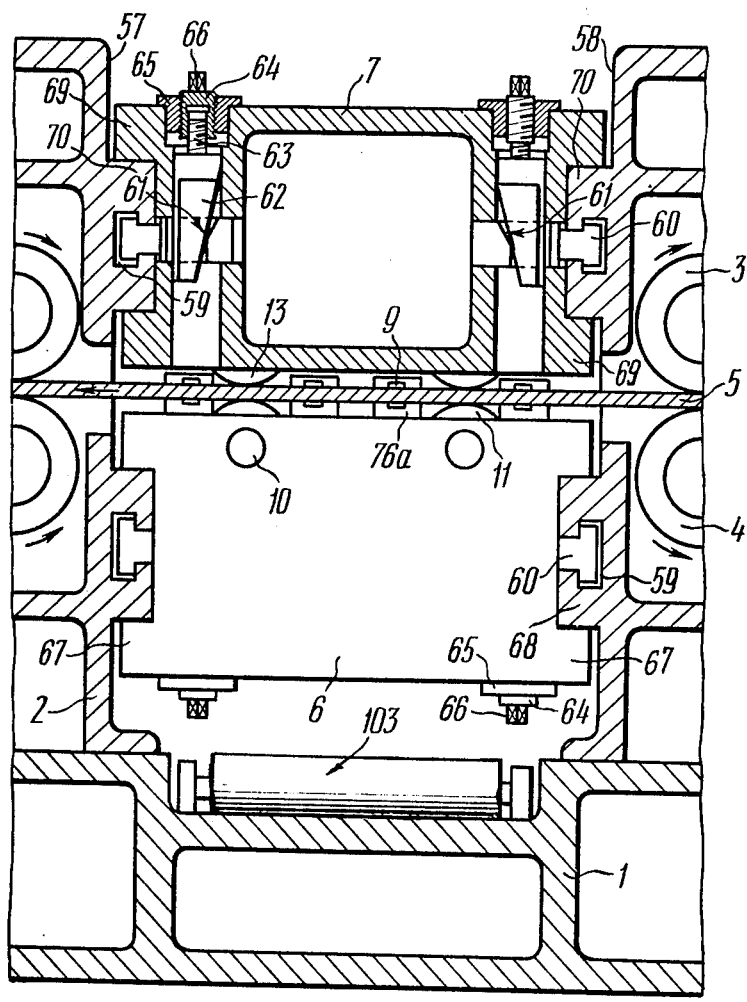
FIG. 6 is a sectional view taken along line VI—VI of FIG. 2.

As mentioned above, the casings 2 are interconnected in series by means of the longitudinally extending beams 6 and 7. For that purpose, on the opposite sides 57 and 58 (FIG. 6) of the casings 2 there are provided T-shaped grooves 59. Two grooves 59 are made at each side 57 and 58 of the casings 2. One groove is intended for the two beams 6 and the other groove is intended for the two beams 7. The grooves 59 are made in parallel with the longitudinal axes of the rolls 3 and 4.

Drawbars 60 are mounted in the grooves 59 and partially received in the longitudinally extending beams 6 and 7 closer to the ends thereof. The drawbars 60 are mounted in parallel with the direction of movement of the sheet 5 and are axially movable. The drawbars 60 located above the sheet 5 are provided with bevels 61 cooperating with wedges 62 to prestress the beams 6 and 7.

The upper part of each wedge 62 (as shown in the drawing) has a cylindrical portion made as a screw 63. The screw 63 is received in the internal thread of a differential screw 64.

The outer thread of the screw 64 is used for a nut 65 fixed to each beam 6 and 7. A square portion 66 is provided on the screw 64 for rotation thereof.

The beams 6 have lateral projections 67 for adjusting the beams 6 along flat guides 68 which are integral with the sides 57 and 58 of the casings 2 under the sheet 5.

The beams 7 have their lateral projections 69 for adjusting them along flat guides 70 which are integral with the sides 57 and 58 of the casings 2 above the sheet 5. The guides 68 and 70 extend in parallel with the longitudinal axes of the rolls 3 and 4 so that the T-shaped grooves are located centrally with respect to the rolls.

For displacement of each of the beams 6 and 7, there are provided two rack-and-pinion gears 71 (FIG. 5) of a conventional machine-tool type. Each rack-and-pinion gear 71 comprises a toothed rack 72 fixed to the casing 2 and a pinion 73 mounted on a shaft 74 journalled in support members 75 fixed to the beams 6 and 7. The shaft 74 is manually rotatable by means of a square portion 76.

Four cutting tools 9 are mounted on each lower beam 6. Each cutting tool 9 of the beam 7 is mounted oppositely to a respective cutting tool of the parallel beam 7 along the longitudinal edges of the sheet 5 being machined. The cutting tools 9 are laterally shifted relative to each other along each edge at the amount of a layer to be removed (or at the amount of feed per one tool 9).

The fixing and feed of the cutting tools 9 are effected in a manner known in mechanical engineering. Each cutting tool 9 is mounted in a tool holder 76a (FIG. 3) attached to the beam 6 and is fixed by a screw 77 and a nut 78 fixed to the tool holder 76a.

Apart from the cutting tools 9, two axles 10 are fixed to the beams 6 (FIG. 3), and two support rollers 11 located beneath the sheet 5 adjacent to the cutting tools 9 are journalled on these axles.

Figure 7:
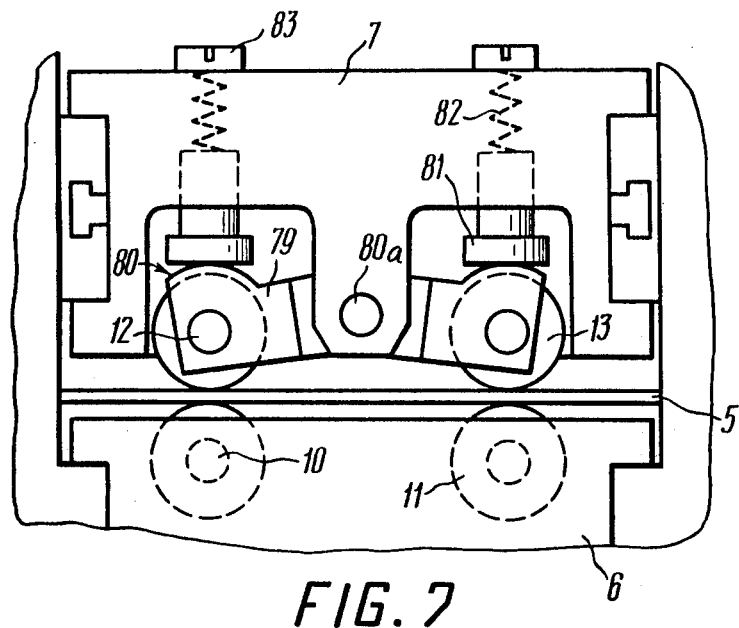
FIG. 7 is a view taken along arrow A of FIG. 3.

Two support rollers 13 are located on each upper beam 7 (FIG. 7). Each roller 13 is rotatably mounted on the axle 12. The axle 12 is mounted in a shackle 79. Both shackles 79 are mounted for limited rotation in the plane of rotation of the rollers 13 on the common axle 80a. The axle 80a is fixed to the beam 7.

The shackle 79 has a cylindrical portion 80 which is engaged by a pusher 81. The pusher 81 is loaded by a compression spring 82. One end of the spring 82 engages the pusher 81 and the other end is in contact with an adjustment screw 83. The screws 83 are fixed to the beams 7.

Figure 8:
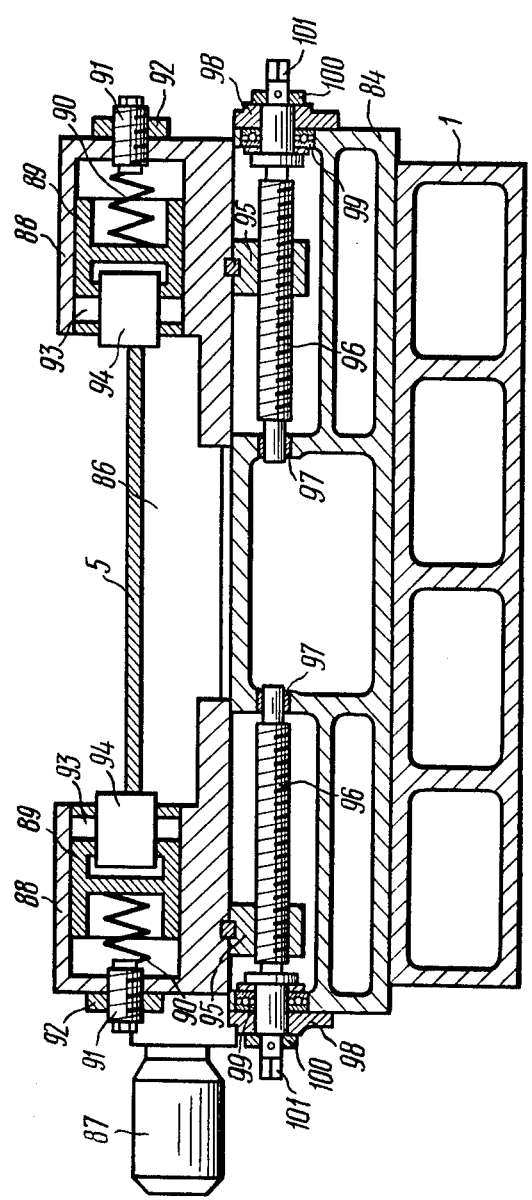
FIG. 8 is a sectional view taken along line VIII—VIII of FIG. 1.

A base 84 of a driven horizontal roller table 85 (FIG. 1) is mounted before the casings 2 on the base 1 in the direction of flow of the sheet 5 being machined. Horizontal rollers 86 are mounted on the base 84. The rollers 86 have independent drives 87 (FIG. 8). Carriages 88 are mounted in between the rollers 86 on the base 84. The carriages 88 are mounted in two parallel rows along the edges of the sheet 5.

The carriages 88 are adjustable according to the width of the sheet 5.

A slider 89 is mounted in each carriage 88 normally to the direction of movement of the sheet 5. One end of a compression spring 90 engages the slider 89. The other end of the spring 90 is in contact with an adjustment screw 91 which is fixed to the carriage 88 by means of a nut 92. An axle 93 is vertically mounted on the slider 89. A support roller 94 is rotatably mounted on the axle 93 to cooperate with an edge of the sheet 5.

A nut 95 receiving a motion screw 96 is fixed to the lower part of the carriage 88. The screw 96 is rotatably mounted in antifriction bearings 97 and 98. Axial displacement of the screw 96 is prevented by means of a thrust rolling bearing 99 and a retainier ring 100. The thrust bearing 99 and the ring 100 bear against the end faces of the bearing 98. The screw 96 is rotated at a square portion 101.

For removal of chips from the cutting zone, longitudinally extending openings 102 are provided in the beams 6 (FIG. 3), the chips falling onto belt conveyors 103 each located in the portion 8 between the casings 2 on the base 1. The belt conveyors 103 are similar in structure to conventional belt conveyors used in machine tools and comprise an endless belt 104 mounted on rollers 105 of which one roller is driven.

The machine according to the invention operates as follows.

Prior to operation, the assemblies of the machine are adjusted in conformity with the width of the sheet 5 being machined.

For that purpose, the beams 6 and 7 (FIG. 5) are displaced in the guides 68 (FIG. 6) and 70 by rotating the square portions 76, the shaft 74, the pinion 73 and the toothed rack 72 to obtain a preset size. Then, the differential screw 64 is rotated at the square portion 66 to axially displace the screw 63 with the wedge 62 cooperating with the bevels 61 provided on the drawbars 60.

The drawbars 60 are caused to move in the axial direction into the portion 8 between the casings 2 to cooperate with their ends extending outside the beams 6 and 7 with the T-shaped grooves 59 of the casings 2. Thus, the beams 6 and 7 are prestressed to ensure a required stiffness of the system "machine-tool-workpiece".

Then the screws 77 (FIG. 3) cooperating with the nuts 78 are rotated to displace the cutting tools 9 in the tool holders 76a. The cutting tools 9 are displaced until their cutting edges are positioned along both edges of the sheet 5 with a relative shift equal to the amount of feed per one cutting tool (that is at the amount of a layer removed by each cutting tool). It should be noted that the distance between the cutting edges of the first two oppositely mounted cutting tools 9 (in the direction of the sheet movement) is a maximum, and the distance between the cutting edges of the ultimate two oppositely mounted cutting tools 9 (in the direction of the sheet movement) is a minimum. This minimum distance is equal to the rated width of the sheet after machining.

Then the motion screws 96 are rotated at the square portions 101 (FIG. 8) to displace the nuts 95 axially along the screws 96. Due to the rigid connection of the nuts 95 to the carriages 88, the latter are also displaced.

The carriages 88 are displaced to obtain a present size corresponding to the width of an unmachined sheet.

After the adjustment of the machine is completed, the electric motor 55 (FIG. 5) is energized. Rotary motion is transmitted from the electric motor 55, via the elastic coupling 53, to the input shaft 52 of the reduction gear 50. The shaft 52 rotates the output shafts 49, via the chain of the spur gears 51, to rotate the universal joint shafts 48. The universal joint shafts 48 rotate the rolls 3 and 4. Due to the frictional engagement on the necks 15 (FIG. 4) and 16 of the rolls 3 and 4 with the rollers 44 and 47, the latter are also caused to rotate.

Concurrently with energizing of the electric motors 55, the drives 87 of the driven roller table 85 are also energized to rotate the rollers 86.

It should be noted that the rotational direction of the rolls 3 and 4 and the rollers 86 should correspond to the direction of the sheet movement (i.e. from right to left as shown in FIG. 1).

The sheet 5 is fed along a shop roller table (not shown) to the driven roller table 85 (FIGS. 1 and 8). Due to the frictional engagement with the rotating rollers 86, the sheet 5 moves relative to the carriages 88. The lateral edges of the sheet 5 cause the rotation of the rollers 94, so that the rollers 94 cause the displacement of the sliders 89 normally to the direction of movement of the sheet 5. The sliders 89 compress the springs 90 to develop a force applied to the edges of the sheet 5 on the part of the rollers 94 to displace the sheet 5 in a horizontal plane normal to the direction of the sheet movement. Thus, under the action of forces exerted by all rollers 94 during the passage of the sheet 5 thereby, the sheet is positioned in the transverse direction relative to the cutting edges of the cutting tools 9 so as to provide for uniform distribution of the allowance for machining among both longitudinal edges of the sheet 5.

As the sheet 5 moves forward (FIG. 4), it is engaged with the rotating rolls 3 and 4 of the first casing 2. At that instant, oil is fed from hydraulic distribution valves (not shown) through the ports 23 into the work stroke chambers 25 of the hydraulic jacks 22 and 38. The hydraulic jacks 22 and 38 act, via the piston rods 27 and 39, on the blocks 20 and the shackle 42 with the rollers 44, respectively, to urge the roll 3 with its surfaces 14 against the sheet 5, thereby urging the sheet 5 against the roll 4. Thus a required urging force is developed to provide for frictional engagement of the rolls 3 and 4 with the sheet 5 so as to create a traction force. During further movement, the sheet 5 causes the rotation of the rollers 11 (FIG. 3) and 13 due to a frictional engagement with its upper and lower sides. The rollers 13 of the beam 7 are urged against the sheet 5 under the action of the spring 82 acting on the cylindrical portion 80 (FIG. 7) of the shackle 79 through the pusher 81. Thus the sheet 5 is urged against the rollers 11 of the beam 6. Therefore, the vertical undulation of the sheet edges and vibration which may occur during machining are eliminated. As the sheet 5 moves further, it is engaged by the next pair of rolls 3 and 4. Thus the traction force becomes greater, and this traction force is uniformly distributed among all the casings 2 due to the provision of the beams 6 and 7.

As the sheet 5 moves forward metal is removed by the cutting tools 9 at the edges thereof, the cutting tools being located on the beams 6 with their cutting edges shifted relative to one another.

Thus, with continuous movement of the sheet 5 at a speed of 15-30 m/min in one direction, a complete machining of both longitudinal edges is effected. It should be noted that each cutting tool 9 removes the same metal layer equal to the amount of feed per tool.

Chips are removed from the cutting zone through the opening 102 (FIG. 3) in the beams 6 by the belt conveyors 103 which are energized as the chips accumulate to remove the chips from the machine.

What is claimed is:

1. A machine for edge forming of sheets for welding, by machining lateral edges of sheets horizontally moving in a production flow comprising: separate casings mounted in series in a spaced relation to one another; fixed cutting tools oppositely mounted along the edges of a sheet being machined; drive rolls for feeding the sheet being machined to the cutting tools, the rolls being accommodated, at least in pairs, in the separate casings; support rollers mounted adjacent to the cutting tools above and beneath the sheet being machined; longitudinally extending beams inter-connecting in series the separate casings, the beams being disposed above and under the sheet being machined so as to form upper and lower longitudinally extending beams; the upper longitudinally extending beams supporting, between the casings, axles of the support rollers located above the sheet being machined; the lower longitudinally extending beams supporting, between the casings, the cutting tools and axles of the support rollers located beneath the sheet being machined; grooves provided on the opposite sides of the casings; and drawbars mounted in the grooves and partially received within the longitudinally extending beams in parallel with the direction of the sheet movement, the drawbars being axially movable in the direction corresponding to the movement of the casings towards one another, under the action of wedges mounted in the beams, through a distance providing for prestressing of the beams.

2. The machine according to claim 1, wherein the longitudinally extending beams are movable in the casings in a horizontal plane normal to the direction of the sheet movement.

3. The machine according to claim 2, wherein the displacement of the beams is effected in flat guides provided on the opposite sides of the casings.

4. The machine according to claim 1, wherein each of the support rollers located in the upper longitudinally extending beams is mounted with its axle in a shackle mounted on the upper beam for limited rotation in the plane of rotation of the support roller under the action of a compression spring cooperating with the beam.

5. The machine according to claim 1, wherein the rolls of each of the casings have an independent drive.

6. The machine according to claim 1, further comprising a driven horizontal roller table disposed before the casings of the drive rolls in the direction of the sheet movement, and two parallel rows of carriages provided on a base thereof which are located between horizontal rollers of the roller table along the edges of the sheet, the carriages being adjustable in accordance with the sheet width, and a slider provided in each of the carriages normal to the direction of the sheet movement, the slider being loaded by a compression spring cooperating, via an adjustment screw, with each of the carriages and supporting a vertical axle with a roller engaging the edge of the sheet.

* * * * *